United States Patent [19]

Gillet

[11] 4,388,544
[45] Jun. 14, 1983

[54] DEVICE FOR CONNECTING A COLLECTOR RING TO A CURRENT LEAD IN A SUPERCONDUCTING ROTOR

[75] Inventor: Roger Gillet, Belfort, France

[73] Assignee: Alsthom-Atlantique & Electricite de France, Paris, France

[21] Appl. No.: 300,827

[22] Filed: Sep. 10, 1981

[30] Foreign Application Priority Data

Sep. 15, 1980 [FR] France .............................. 80 19821

[51] Int. Cl.³ ........................................ H02K 11/00
[52] U.S. Cl. ........................................ 310/71; 310/61; 310/219; 310/261
[58] Field of Search ................... 310/61, 52, 54, 59, 310/58, 64, 10, 40, 219, 165, 45, 71, 261, 74, 153, 191; 339/5 R, 8 R

[56] References Cited

U.S. PATENT DOCUMENTS

| | | | |
|---|---|---|---|
| 3,524,090 | 8/1970 | Sark | 310/58 |
| 4,014,599 | 3/1977 | Bogdanov et al. | 310/71 |
| 4,091,299 | 5/1978 | Vitchenko | 310/165 |
| 4,134,037 | 1/1979 | Berthet | 310/52 |
| 4,155,019 | 5/1979 | Weghaupt | 310/165 |
| 4,267,475 | 5/1981 | Vitchenko | 310/61 |

FOREIGN PATENT DOCUMENTS

| | | | |
|---|---|---|---|
| 1269236 | 5/1968 | Fed. Rep. of Germany | 310/61 |
| 2157929 | 5/1973 | Fed. Rep. of Germany | 310/61 |
| 2235518 | 1/1975 | France | 310/61 |
| 2316775 | 1/1977 | France | 310/61 |

*Primary Examiner*—R. Skudy
*Attorney, Agent, or Firm*—Sughrue, Mion, Zinn, Macpeak & Seas

[57] ABSTRACT

The current lead operates at a cryogenic temperature. The collector ring operates at room temperature. While the rotor is being cooled down there is considerable relative movement between them due to thermal contraction. Electrical connection is ensured by interconnecting "rear" or cold side rods with "front" or warm side rodes. The device of the present invention comprises an insulating connector box (12) mounted on the shaft of the rotor. Inside the connector box there are inner and outer pairs of contact blocks (24,23) which clamp onto both a single rear rod (14) and a pair of front rods (16,18). The clamping force is provided by flyweights (28a,b,c). The rotor may thus be cooled to cryogenic temperatures while stationary or rotating slowly since the rods are loosely clamped if at all, and can slide relative to each other. Once working temperatures are reached the rotor is accelerated and the rods are tightly clamped to provide good electrical contact.

3 Claims, 11 Drawing Figures

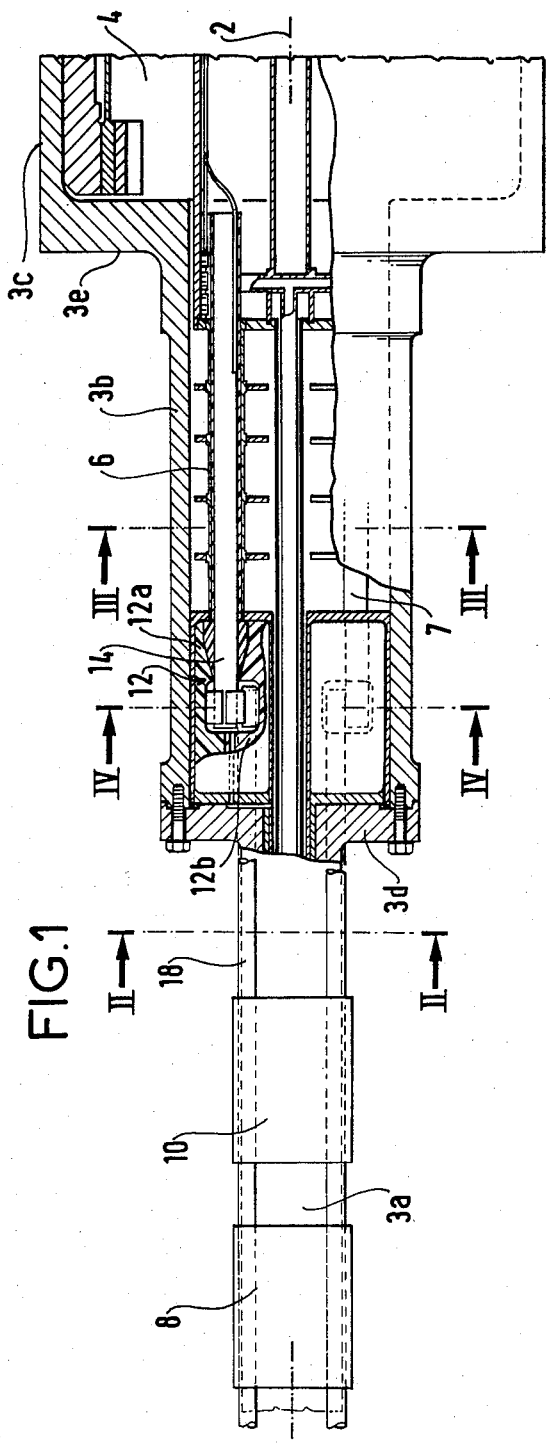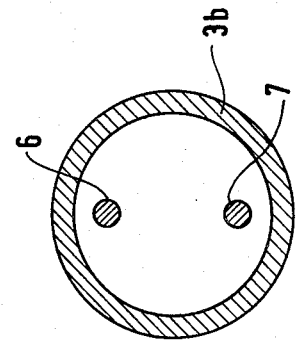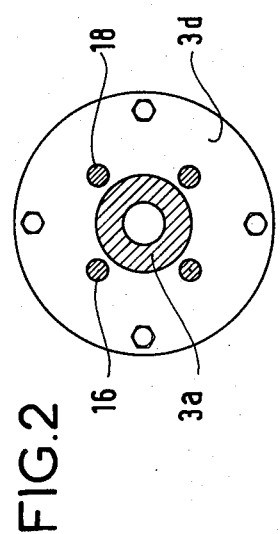

DEVICE FOR CONNECTING A COLLECTOR RING TO A CURRENT LEAD IN A SUPERCONDUCTING ROTOR

The invention relates to a device for connecting a collector ring to a current lead of a superconducting rotor.

BACKGROUND OF THE INVENTION

The invention applies more particularly to the construction of a dynamoelectric rotating machine such as an alternator whose rotor has "superconducting" induction windings, i.e. windings made of a substance which becomes superconducting when it is cooled to a sufficiently low temperature e.g. 4° K. (often referred to as "cryogenic"). Then, in addition to said electrical windings and the electric connection means necessary to supply current to them, the rotor further requires a cooling circuit to cool the windings from ambient temperature to said cryogenic temperature before operation of the alternator, and to keep the windings at said temperature during operation.

For each connection, said electric connection means include a cold current lead and a conventional rotating ring at ambient temperature. The ring co-operates with stationary brushes. The function of such a current lead is to ensure electric connection between an ordinary conductor at ambient temperature and one end of a superconductor while requiring as low a refrigerating power as possible to keep this end at cryogenic temperature despite the heat input from the current lead. The refrigerating power is the electrical or mechanical power needed by the refrigeration units such as helium liquefiers to keep the superconducting units at their normal operating temperature.

Such a current lead is described for example in U.S. Pat. No. 4,134,037.

The conductors are disposed longitudinally, i.e. parallel to the axis of the rotor, to ensure connection between the rings and the current leads. They are subject to severe conditions. Firstly, when the rotor is cooled (which is done at low rotation speed) the current leads shrink longitudinally to an appreciable extent. Secondly, the conductors connected to the collector rings expand during operation due to heating caused by the flow of a high electric current (between 5,000 and 10,000 amp) once the inductor is energized.

Further, it is necessary to take into account the danger of electric breakdown resulting from high voltages which can rise to 10 kV in the case of an incident. This danger is increased when the helium used is hot, since hot helium is a very poor dielectric.

Of course, connection can be ensured between the current leads and the rings by means of resilient corrugated conductors which can be formed for example by stacks of thin copper strips. However, such a solution is generally too bulky for the very small space that is available and in which screws cannot usually be used.

Preferred embodiments of the present invention provide a device for connecting a collector ring to a current lead of a superconducting rotor, which device allows reliable connection to be provided without giving rise to obstructive mechanical stress, without danger of electric breakdown or of faulty contact and without being too bulky.

SUMMARY OF THE INVENTION

The present invention provides a device for connecting a collector ring to a current lead in a superconducting rotor, said rotor having an axis of rotation which defines a longitudinal direction, wherein said device includes:

an electrically insulating connection box fixed to the rotor and having a "front" surface at its end nearest the collector ring and a "rear" surface at its end nearest the current lead;

at least one "front" electrically conducting rod connected to the collector ring and disposed longitudinally in the box;

at least one "rear" electrically conducting rod connected to the current lead and disposed longitudinally in the box;

an outer metal contact block held in the box in contact with said front and rear rods, the contact of at least one of said rods with said outer block being provided by radially outward thrust of the rod against a radially inner surface of said outer block whereby said rod may slide longitudinally over said inner surface when said thrust is not so large as to prevent sliding; and at least one radially movable flyweight placed inside the contact box in a radially inner position relative to each said rod that is held in contact with said inner surface of said outer contact block, whereby the centrifugal force which results from the rotation of the rotor and is exerted on said flyweight supplies said radially outward force which thrusts the rod against said contact block and thus ensures good electric contact when the rotor reaches its normal working speed.

BRIEF DESCRIPTION OF THE DRAWINGS

An embodiment of the invention is described hereinafter by way of a non-limiting example with reference to the accompanying drawings. It must be understood that without going beyond the scope of the invention, the units described and illustrated could be replaced by other units which perform the same technical functions. When the same unit is illustrated in several figures it bears the same reference symbol in all of them.

FIG. 1 is an axial section through the end of a superconducting rotor.

FIGS. 2 and 3 are cross-sections through the same rotor on planes perpendicular to its axis, indicated by lines II—II and III—III respectively of FIG. 1.

DESCRIPTION OF PREFERRED EMBODIMENT

Figure 4:
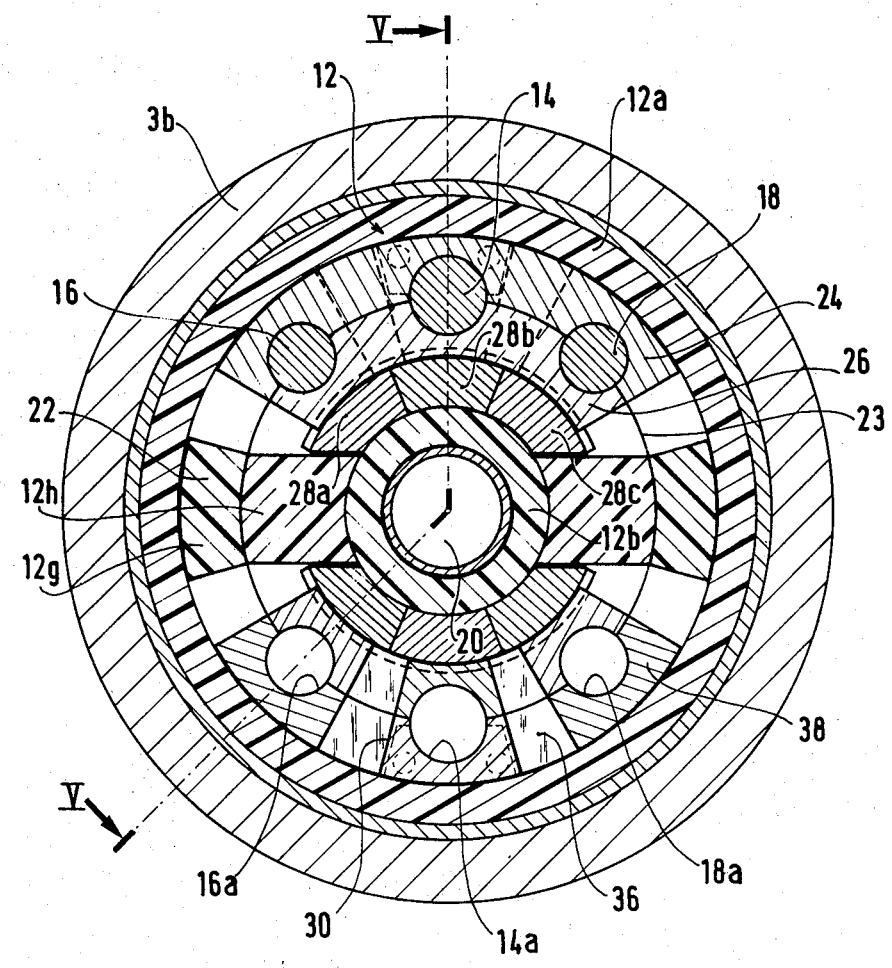
FIG. 4 is a cross-section indicated by lines IV—IV of FIG. 1 through a device in accordance with the invention, the section plane being perpendicular to the axis of the rotor, and the figure being on a larger scale than the preceding figures.
Figure 5:
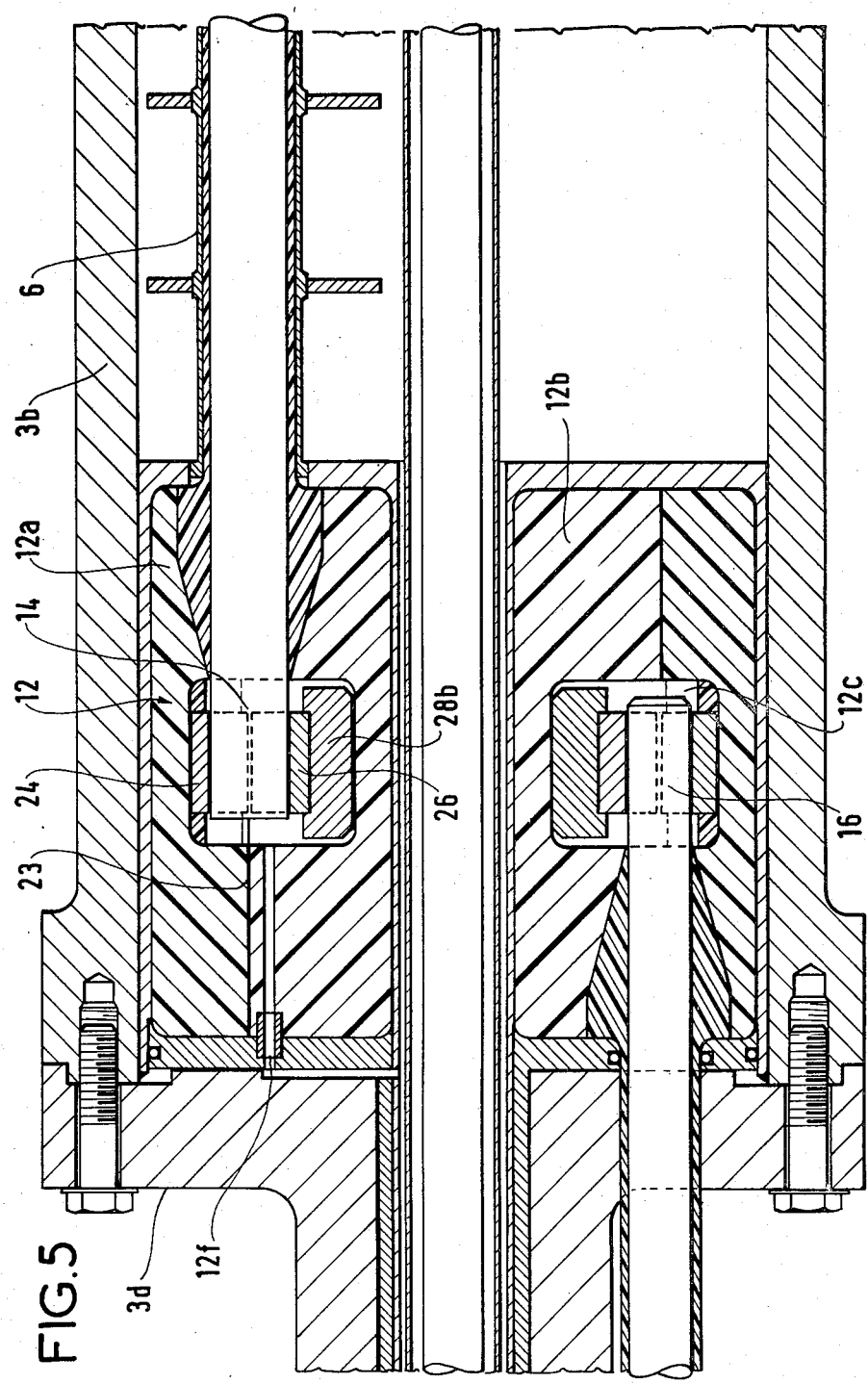
FIG. 5 is an axial section through the device in two planes V—V indicated in FIG. 4.

In FIG. 1, a superconducting rotor rotates about an axis 2. Its rigidity is ensured by a surrounding hollow shaft constituted by sections 3a, 3b, 3c of various diameters connected together by flanges 3d, 3e. It is supported by bearings, not shown. The rotor includes an inductor 4 which contains superconducting windings cooled by liquid helium and fed with direct current via two current leads 6 and 7 which, as previously explained, allow transition between the superconducting zone and the zone of normal conduction. These current leads themselves receive current via two collector rings 8 and 10 which rotate with the rotor and are located at a "front" end thereof and co-operate with stationary collector brushes, not shown. The current leads are connected at their front ends to an electrically insulating connection box 12 in whose rear surface they enter in the form of two longitudinally—disposed "rear" rods such as 14, made of copper and including an internal passage through which helium flows. The helium comes from the superconducting winding and is heated on passing through the current leads.

The collector rings are each connected to the box 12 by respective copper rods such as 16 and 18 which enter the front surface of the box. A device in accordance with the invention provides the electric connection between the front rods 16 and 18 and the rear rods 14 in the box 12. Mechanically the connection must allow large longitudinal movements of the rods at zero or low speed of the rotor, while electrically, at working speed, the connection must pass a current which may reach 10,000 A for example, without obstructive contact resistance.

Figure 6:
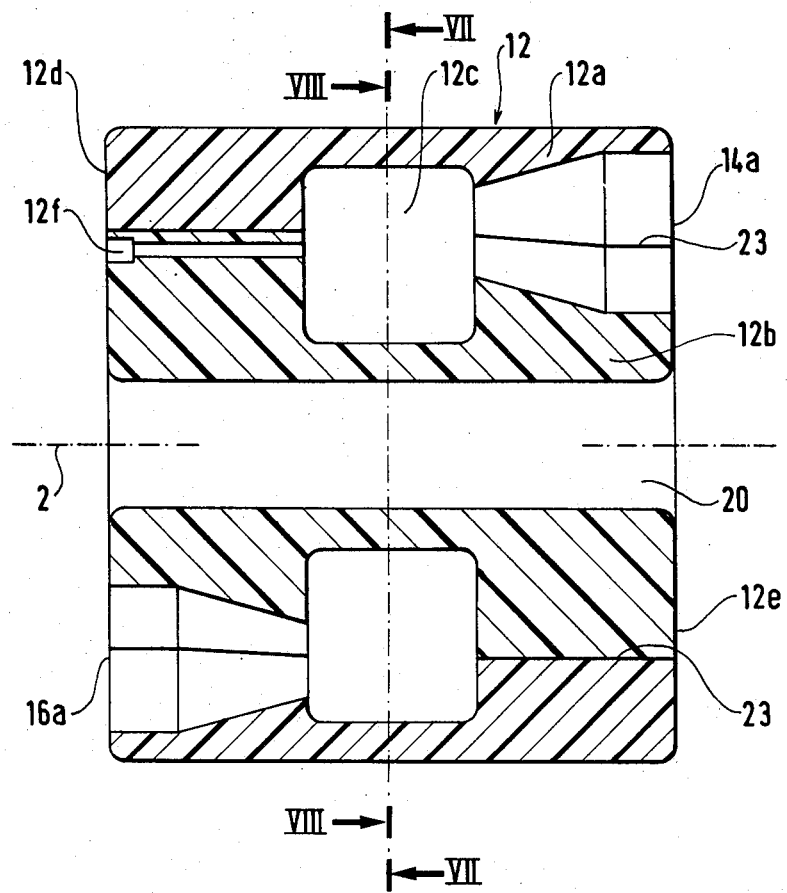
FIG. 6 is an axial section through a connection box for the device in the same two planes V—V indicated in FIG. 4.

Of course, the rotor is equipped with two devices in accordance with the invention, one for each of the connections between a collector ring and a current lead. Only one of these devices is described in detail, it being understood that they are symmetrical about the axis of the rotor. These two devices are disposed in the box 12 which is common to both of them and is generally annular in shape with an axial passage 20 for the rotor shaft. A diametral partition 22 separates it into two symmetrical compartments which are insulated from each other and each of which contains one of the devices. The box 12 is made from two contiguous coaxial tubular sleeves made of thermosetting resin reinforced with fibre glass. The sleeves comprise an outer sleeve 12a (see FIG. 6) and an inner sleeve 12b, with an intermediate hollow portion in each of the contiguous surfaces constituting an annular chamber 12c which goes all round the axis and with orifices such as 16a and 14a on the front surface 12d and on the rear surface 12e for the rods such as 14 and 16 to pass through.

Figure 7:
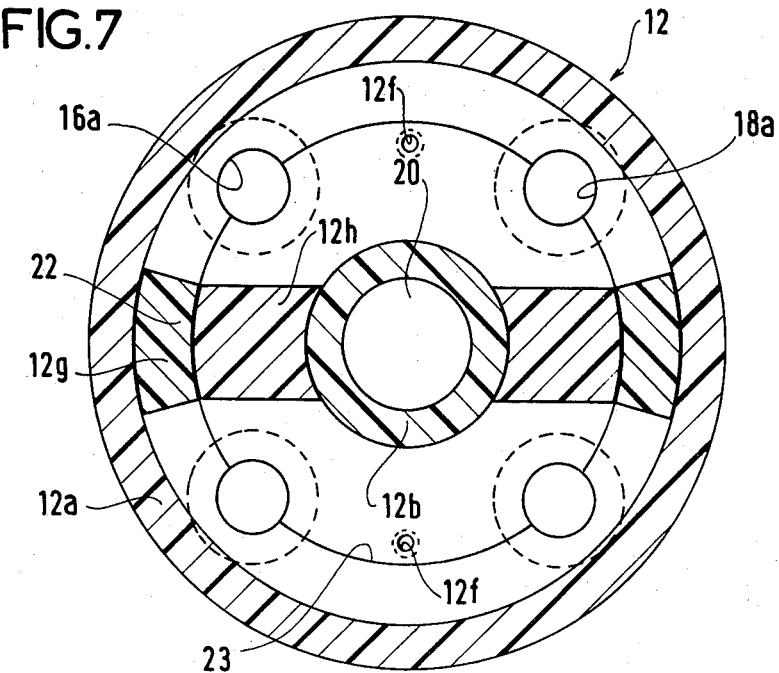
FIGS. 7 and 8 are cross-sections through the same box in a plane perpendicular to the axis and looking in two opposite directions VII—VII and VIII—VIII respectively indicated in FIG. 6.
Figure 8:
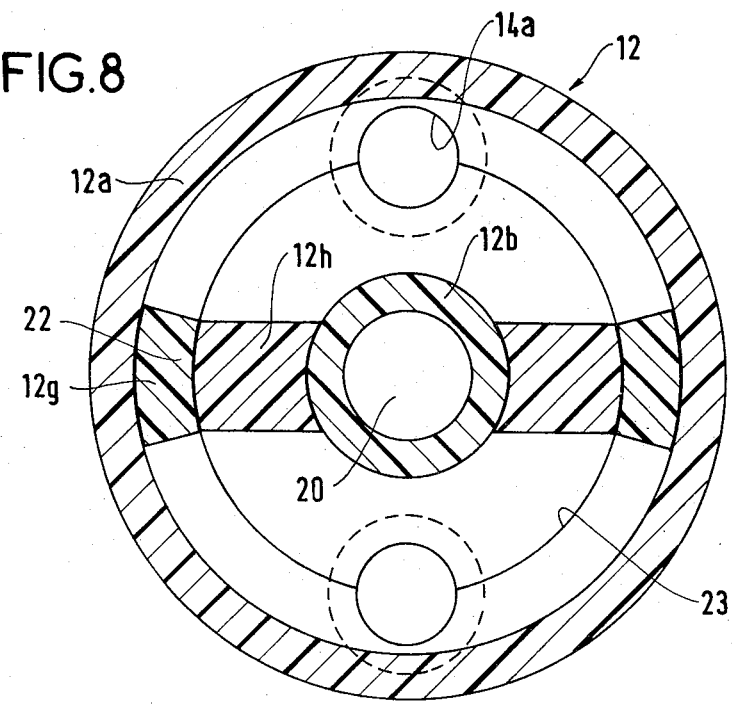
Figure 9:
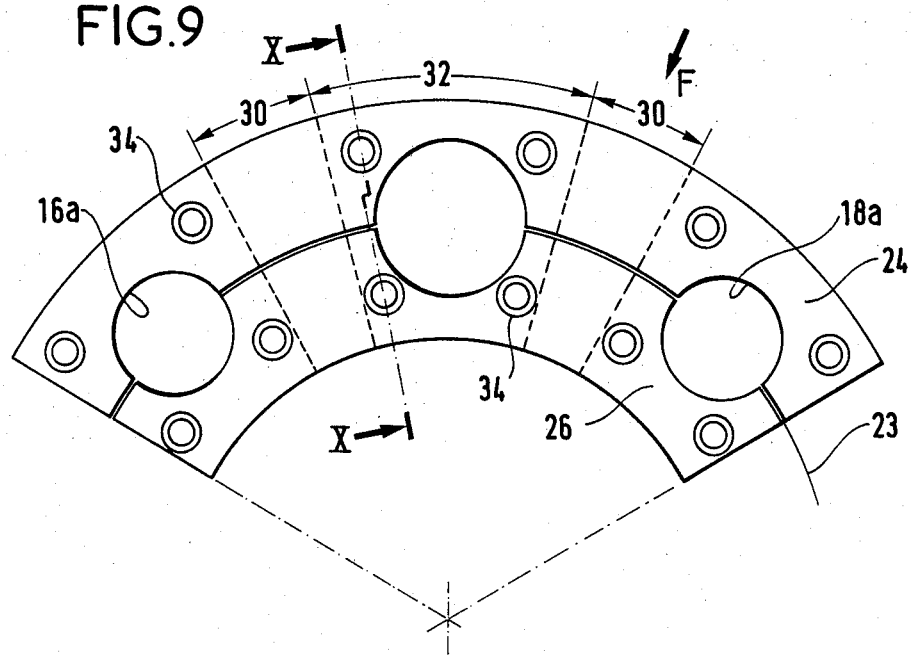
FIG. 9 illustrates conducting rods and contact blocks of the same device in a cross-section on a plane perpendicular to the axis of the rotor on an even more enlarged scale.
Figure 10:
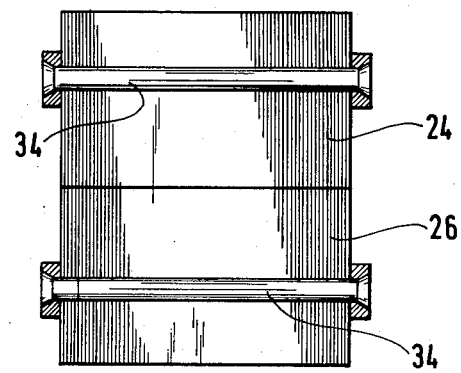
FIG. 10 is an axial section along X—X of FIG. 9 through the contact blocks of the same device.
Figure 11:
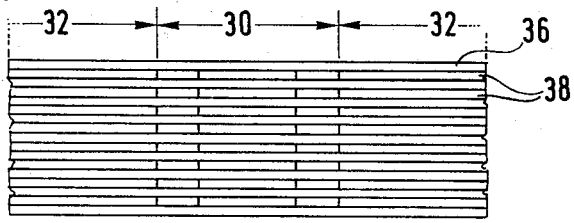
FIG. 11 is a partial top view of the outer contact block of the same device seen looking in the direction of arrow F in FIG. 9.

To provide high resistance to high electric voltages these orifices are flared towards the outside of the box, the gap between the walls of the orifices and the side walls of the rods subsequently being filled with a thermosetting resin. Orifices 12f of small cross-section allow evacuation of the helium which arrives via the inner passage of the rear rod 14. The diametral partition 22 is constituted by gluing two annular blocks one, 12g (see FIG. 7 and FIG. 8), on the inner wall of the outer sleeve 12a, and the other, 12h, on the outer wall of the inner sleeve 12b, so as to fit the inner sleeve 12b fitted with its block 12h in the outer sleeve 12a with its block 12g. The surface separating the two assemblies thus constituted is a cylindrical body of revolution 23 about the axis 2.

Each device in accordance with the invention is disposed in one of the two compartments which, in the annular chamber 12c, are separated by the partition 22. Each includes an outer contact block 24 and an inner contact block 26 which almost come into contact with each other along a surface 23. Longitudinal grooves 14a, 16a and 18a are provided in the facing surfaces of these blocks to accomodate rods 14, 16 and 18. The grooves are sufficiently shallow to enable the rods to be clamped between a pair of blocks.

Fly weights 28 disposed against the radially inner surface of the inner contact block provide this clamping efficiently when they are subject to the high centrifugal force which results from the rotating rotor at its normal working speed (e.g. 3000 r.p.m.). In contrast, while the rotor is being cooled down, its speed is low or zero and nothing prevents the rods 14, 16 and 18 from sliding longitudinally relative to the contact blocks.

It seems advantageous to adopt the following dispositions.

There are two front rods 16 and 18 which are disposed on either side of the rear rod 14 at the same distance from the axis 2 of the rotor as the rear rod, with angular displacements which are symmetrical about the rear rod.

Three flyweights 28a, 28b, 28c are disposed radially internally relative to respective ones of said three rods.

The cross-section through the contact block in a plane perpendicular to the axis of the rotor is in the shape of segments of concentric circular rings.

Each of the contact blocks 24, 26 is constituted by an axial stack of two types of metal sheet 36, 38 fixed to one another in successive plane layers of alternating type. The metal sheets of the first type 36 are continuous, but the metal sheets of the second type 38, include voids in those angular segments 30 that are located between two adjacent rods 14, 16. All the metal sheets are complete in those angular segments 32 which include said rods. This arrangement ensures the contact blocks are rigid in the immediate vicinity of the rods while being capable of bending slightly in the empty segments to enable the front rods 16 to move a short distance longitudinally relative to the rear rod 14, even when the rotor is rotating at its normal working speed.

These metal sheets are made of 0.5 mm thick copper sheet which is cut and tinned, and then fixed together initially by means of rivets 34, and subsequently by welding, brazing or soldering.

The inner and outer blocks are formed as a single block and are then separated from each other by sawing.

I claim:

1. A device for connecting a collector ring to a current lead in a superconducting rotor, said rotor having an axis of rotation which defines a longitudinal direction, wherein said device includes:
   an electrically insulating connection box fitted to the rotor and having a front surface at its end nearest the collector ring and a rear surface at its end nearest the current lead;
   at least one front electrically conducting rod connected to the collector ring and being disposed longitudinally in the box;
   at least one rear electrically conducting rod connected to the current lead and disposed longitudinally in the box and being side by side with said front rod over a portion of its length;

inner and outer metal contact blocks mounted within said box and being positioned radially opposing each other and on opposite sides of said front and rear rods such that the outer metal contact block contacts the radially outer surfaces of said front and rear rods, said inner metal contact block contacts the radially inner surfaces of said front and rear rods and said rods slide longitudinally over the contacting surface of said inner and outer metal contact blocks absent normal speed rotor rotation; and at least one radially movable flyweight placed inside the contact box in a radially inner position relative to said inner block and in operative engagement therewith, whereby; the centrifugal force resulting from rotation of the rotor exerted on said flyweight supplies a radially outward force at normal operating speed of the rotor which effectively clamps the front and rear rods between said inner and outer contact blocks to prevent relative longitudinal movement between said rods and said contact blocks to ensure good electric contact when the rotor reaches its normal working speed.

2. A device according to claim 1, wherein said at least one rod comprises two front rods disposed on either side of said at least one rear rod at the same distance from the axis of the rotor as the rear rod and symmetrically disposed on either side of the rear rod, and wherein said at least one flyweight comprises three flyweights, each being disposed radially inside respective ones of said three rods, and the cross-section through the contact block in a plane perpendicular to the axis of the rotor being shaped like segments of concentric circular rings.

3. A device according to claim 2, wherein each of the contact blocks is constituted by an axial stack of metal sheets fixed together in successive plane layers, alternate layers of the stack including voids with no metal sheet in empty angular segments situated between two rods and at a distance from them, there being a metal sheet in all the layers in solid angular segments which include the rods, whereby the block is capable of bending slightly in said empty segments to accommodate small relative longitudinal displacements between the rods even while the rotor is rotating at its normal working speed.

* * * * *